April 28, 1970     A. K. DIETRICH ET AL     3,508,345
FOG SIMULATOR FOR PILOT TRAINING
Filed Aug. 22, 1967
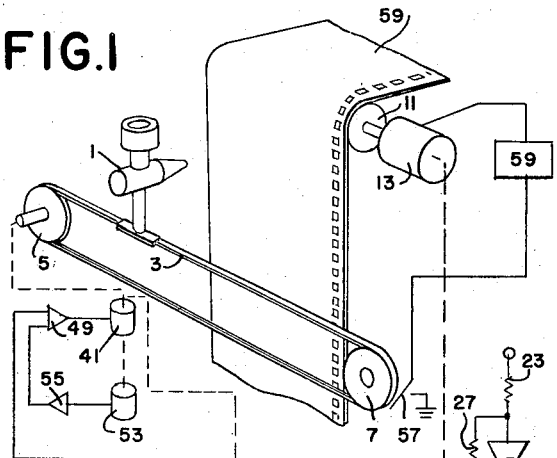
FIG.1
FIG.3
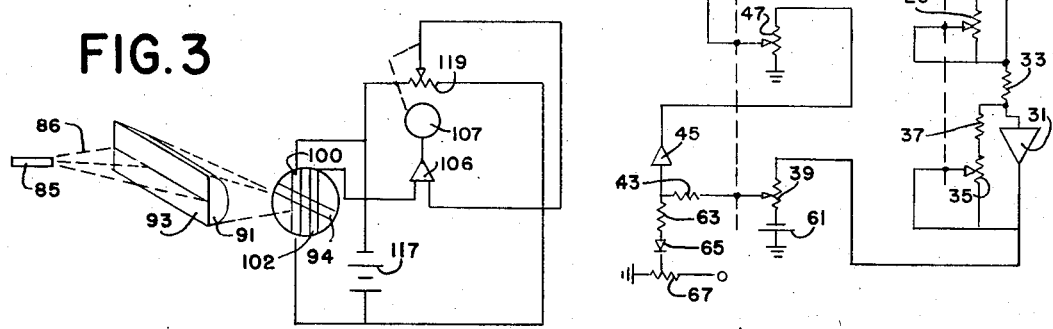
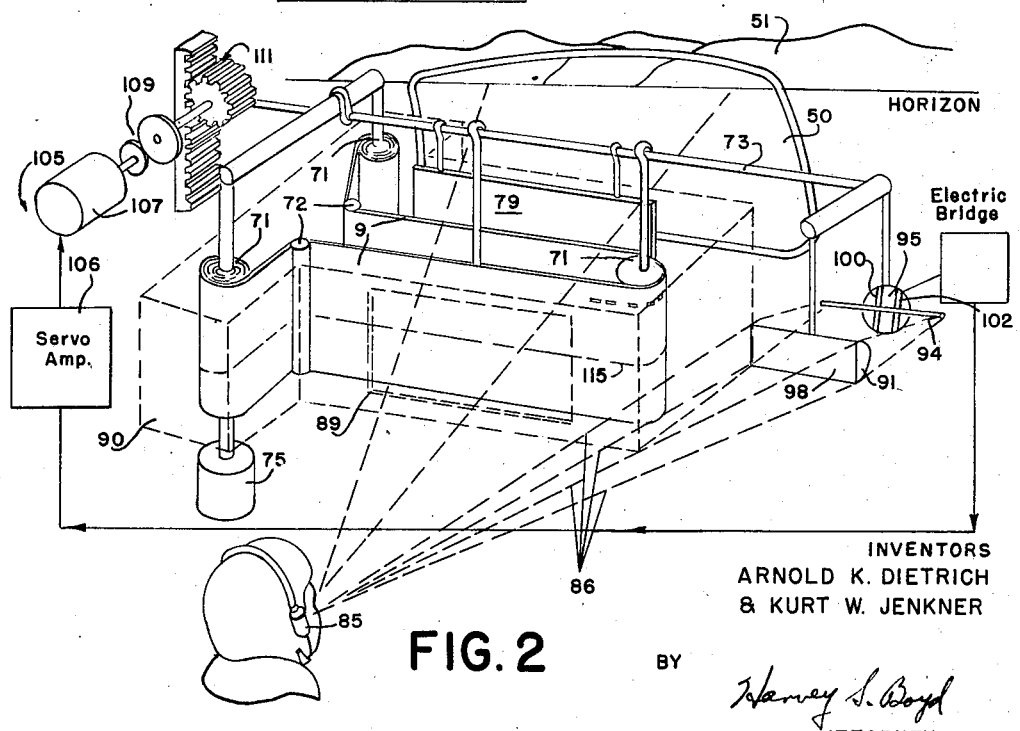
FIG. 2
INVENTORS
ARNOLD K. DIETRICH
& KURT W. JENKNER
BY *Harvey S. Boyd*
ATTORNEY

United States Patent Office 3,508,345
Patented Apr. 28, 1970

3,508,345
FOG SIMULATOR FOR PILOT TRAINING
Arnold K. Dietrich, Binghamton, and Kurt W. Jenkner, Vestal, N.Y., assignors to the United States of America as represented by the Secretary of the Army and/or the Administrator of the Federal Aviation Administration
Filed Aug. 22, 1967, Ser. No. 662,549
Int. Cl. G09b 9/08
U.S. Cl. 35—12                5 Claims

ABSTRACT OF THE DISCLOSURE

This invention relates to training aids in operational aircraft to provide the pilot with varying visibility conditions. More particularly, the present invention provides means for simulating different fog conditions on a film and means for advancing this film in the sight path of a pilot to correspond to different fog conditions present at different altitudes.

BACKGROUND OF THE INVENTION

In the past, fog simulation involved a rather cumbersome process of introducing actual smoke particles into the environment in order to simulate a fog condition. Several disadvantages of such an arrangement include the inability to accurately control the condition, no permanent effect, the inability to accurately reproduce a desired fog condition, and the difficulty in displaying fog conditions in operational aircraft.

SUMMARY OF THE INVENTION

In accordance with the present invention, there is provided a fog simulator for use as a pilot training aid in operational aircraft and including computer controlled coating apparatus for producing a fog simulated film. The film is coated with a light scattering material which gives objects viewed through it a variable foggy appearance according to the amount of light scattering material applied to the surface of the film. The film is mounted in a frame of a visual display device positioned between the pilot and the windshield of an aircraft cockpit, with sensing means being provided in the display device for positioning the film in accordance with a viewer's movements in order to maintain the display in proper spatial perspective.

Accordingly, it is an object of the present invention to provide means for producing a fog simulated record and for displaying the same which overcomes the defects of prior art arrangements.

It is another object of the present invention to provide a permanent fog simulated record by coating a film with light scattering material.

It is a further object of the present invention to provide computer controlled coating apparatus for producing any desired effect on the film.

It is still another object of the present invention to provide a visual display device for positioning the film in the sight path of a viewer.

It is still a further object of the present invention to provide means for sensing the viewer's movements for controlling the positioning of the film.

Other objects and advantages of this invention will become more readily apparent by reference to the following detailed description when taken in conjunction with the accompanying drawings.

BRIEF DESCRIPTION OF THE DRAWINGS

FIG. 1 is a perspective and schematic view of the computer controlled coating apparatus;

FIG. 2 is a perspective view of the visual display device of the present invention arranged in an aircraft cockpit; and FIG. 3 is a circuit diagram of the sensing means for the display device.

DESCRIPTION OF THE PREFERRED EMBODIMENT

Referring now to the drawings, there is shown in FIG. 1 a spray gun 1 mounted on an endless band 3 which is rotatably supported on a pair of rollers 5, 7. The roller 5 is driven by an analogue computer arrangement, the operation of which will be more fully described later. A basic concept of the present invention is that the simulation of fog is achieved by spraying non-pigmented lacquer consisting of a solvent and a dissolved material on an optically clear substrate 9, such as a Mylar film so as to provide a light scattering coating thereon. The film 9 is carried on a roller 11 which is controlled by a servomotor 13 with the film being advanced in a path transverse to the path of the spray gun. In accordance with the invention, the spraying is computer controlled to simulate fog conditions of varying degrees of density.

FIG. 2 shows the fog simulator display in operation. The pilot looks through several layers of Mylar film and through the airplane cockpit window 50 to distant objects such as at 51. The film is coated according to the altitude, distance and specified condition of the transmittance desired to be simulated. Thus, various refractive indices of fog may be readily simulated by longitudinally coating the film in varying densities. Generally, the longitudinal density relation is linear. However, the use of a linear longitudinal relationship requires a large amount of film length in order to simulate varying ranges of refractive indices. It has been found that by varying the longitudinal density quadratically, a great saving in film footage is obtained. Moreover, a more realistic simulation can be obtained if the density of the spray in the vertical direction of the film is varied hyperbolically. To this end, the computer shown in Fig. 1 is utilized.

In order to provide correct simulation of natural fog, the density of the light scattering coating must be proportional to the distance between the observer and objects 51 seen through the layers of film. The film is servo-positioned to remain vertically aligned, i.e., a horizontal line 115, shown in phantom line, on the film will always be aligned with the actual horizon when the pilot looks through it. The objects seen through this line on the film are thus located at infinity. A simple geometric relationship shows that objects viewed through portions of the film lower than the horizon line are closer to the observer. The object distance is inversely proportional to this vertical screen coordinate. It is obvious that for a true fog simulation, a density variation or density gradient must be produced which is proportional to the vertical screen coordinate and a hyperbolic density variation of the simulated fog coating in a vertical direction across the film achieves this object.

The foggy appearance of the film is obtained by a spraying technique in which a spray of a clear lacquer is applied to the Mylar film. The composition of the lacquer, the nature of the solvents, and the distance between the spray gun and the film is chosen such as the droplets reaching the film are still wet enough to adhere to the surface, while at the same time being dry enough to remain separated. The spraying pressure and nozzle size of the spray gun are selected to produce optimum droplet sizes with variations in fog density being produced by variations in spray gun velocity. It has been found that the density of the simulated fog produced by the spraying method is inversely proportional to the square root of the gun velocity, V. The computer which controls the motion of the spray gun in the completely automatic spraying apparatus, must therefore provide the following function:

$$V = K\left(\frac{Y}{X}\right)^2$$

because:

$$\text{Fog density, } D = \frac{K^1}{\sqrt{V}}$$

and the required $$D = K^1 \frac{X}{Y}$$

where:

V=spray gun velocity;
X=horizontal film coordinate;
Y=vertical film coordinate;
D=fog density; and
K & $K^1$=scaling factors.

Thus, the computer must provide the functions $1/X^2$ and $Y^2$ in order to provide these functions, the computer comprises an amplifier 21 which is fed with a constant voltage via a resistor 23. The amplifier 21 is provided with a feedback loop having a potentiometer 25 and a resistor 27 connected in series. The wiper arm of the potentiometer 25 is mechanically connected to motor 13 such that its resistance varies with the film coordinate X. Thus, at the output of the amplifier 21, the function $1/X$ will appear. The resistor 27 is of small ohmic value and serves to limit the amplifier gain to its maximum practical value. Similarly, another multiplication by the factor $1/X$ is performed by an amplifier 31 which is coupled to the output of amplifier 21 via resistor 33. The amplifier 31 also has a potentiometer 35 connected in series with a resistance 37 in a feedback loop. The output of the amplifier 31 is, therefore, proportional to $1/X^2$. The output of amplifier 31 is coupled to a potentiometer 39 having a wiper arm which is coupled to the shaft of motor 41. This motor controls the movement of roller 5 and thus the movement of the spray gun 1. The wiper arm of potentiometer 39 is electrically coupled via a resistor 43 to the input of amplifier 45. Since the motor 41 represents the film coordinate Y, the voltage at the wiper arm of the potentiometer and also at the output of amplifier 45 is proportional to $Y/X^2$. The output of amplifier 45 is coupled to a potentiometer 47 which provides a second multiplication with the factor Y. The voltage at the wiper arm of potentiometer 47 is proportional to $Y^2/X^2$ which, according to the spraying equation, should be equal to the velocity of the spray gun, V. The wiper arm of potentiometer 47 is electrically coupled to an amplifier 49 and mechanically coupled to the motor 41. The amplifier 49 compares the input voltage from the potentiometer 47 with a signal from a tachometer generator 53 via an amplifier 55. The tachometer generator output is accurately proportional to motor speed and therefore the high gain servo amplifier 49 assures the equality of the spraying equation. Thus, the velocity of the spray gun will always be proportional to $Y^2/X^2$ which as explained above, provides the desired hyperbolic-quadratic density variation over the fog film.

It is thus evident that at and above the horizon line 115, the object distance is infinite and consequently, the degree of fogginess is also infinite. From the equation $$V = \frac{Y^2}{X^2}$$

this would correspond to zero velocity for the spray gun which, of course, is not practical. Thus, it is sufficient to spray a density somewhat above the visibility limit which corresponds to a minimum spray gun velocity. Accordingly, a constant voltage source 61 is provided in the ground lead of the potentiometer 39 so as to limit the minimum gun velocity to that amount. Similarly, the maximum speed of motor 41 must also be limited to prevent saturation of the amplifiers and the running away of the servomotor. Accordingly, this is achieved by a clamping circuit coupled to the junction of the amplifier 45 and resistor 43. This circuit comprises a resistor 63 coupled to the junction and in series with a clamping diode 65. The clamping diode is coupled to the arm of a variable resistor 67 which is connected between ground and a reference voltage. Thus, the minimum and maximum speed of the motor is controlled.

It should be noted that in the preferred embodiment of the invention, the longitudinal density is varied quadratically rather than linearly. However, the computer described may also be used for providing a linear longitudinal density relationship by utilizing the output of amplifier 21. The operation of the computer is such that the position of motor 13 which represents the footage of the film to be coated is utilized to generate the input to motor 41. As the spray gun 1 is moved laterally across the film, motor 41 positions the wiper arm of potentiometers 47 and 39 so that the input to this motor varies hyperbolically and, thus, as the spray gun is moved across the film, the velocity is increased hyperbolically. After the first sweep of the gun across the film, the gun contacts a micro switch 57 which is arranged proximate to rollers 7. This micro switch provides a film advance pulse via film advance means 59 to the motor 13 while the spray gun is simultaneously returned to its original position. Thus, after each pass, the film is moved a constant increment which is small compared to the spray pattern so that there is no apparent structure in the coating of the film.

Referring now to FIG. 2, there is shown the fog simulator display device using the fog film 9 produced by the apparatus and method of FIG. 1. The fog film is formed into a loop about rollers 71 which are suspended from a horizontal bar 73. There are also provided means such as rollers 72 for maintaining the film taut in the display device. A drive motor 75 is coupled to one of the rollers 71 and is responsive to altitudes signals for advancing the film to the desired fog density. A compensating fog film 79 is also suspended from the horizontal bar and is provided with a density variance across the length thereof. The use of a compensating film is necessitated because of the quadratic density variation provided along the length of the looped film. Thus, the pilot actually sights through three strips of film which provide an additive fog effect to achieve the desired fog density. As further shown in FIG. 2, an infrared filtered light source 85 is attached to the head phone of the pilot in a manner such that the light is always positioned at the level of the pilot's eyes and at the line of vision shown in dashed line. The pilot looks through the window 89 formed in the film housing 90, shown in broken line, and the light rays 86 provided by source 85 strike a cylinder lens 91 on its face 93. The cylinder lens images the light source to produce a horizontal light bar 94 on a light positioned transducer 95, the lens and transducer being suspended from bar 73. The transducer comprises a photoconductor with parallel deposits of a resistive strip 100 and a non-resistive collector 102. The transducer or photopotentiometer is essentially a light activated semiconductor analogue of the mechanically operated potentiometer.

A voltage is applied to the resistive strip 100 and is divided by the light bar which is projected upon the photoconductive gap by the light source. Any vertical head motion of the pilot causes a corresponding vertical shift of the light bar such that the bridge voltage is proportional to the eye level position. The bridge voltage activates in a conventional manner a servosystem 105 comprising a servo amplifier 106 and a servomotor 107 via a motion assembly including a gearing arrangement 109 and a rack and pinion 111. This pinion gear is coupled to the bar 73 such that the film housing with the gearing arrangements, film rollers, and including the transducer and the lens moves readily up or down in correspondence with the pilot's vertical head motion.

It is thus apparent that the fog film is always positioned in relation to the pilot's eye level in a manner necessary to maintain a correct visual alignment of the density, the airplane's pitch angle and the selective range of vision. The film is coated with a hyperbolic density function from its bottom extremity to an established line shown in broken line on the fog film and denoted as the film horizon 115. The density of this coating from this line upwardly has a maximum fogginess. Obviously, continuing sections of the film can be coated to varying degrees of density and the film is revolved freely on the rollers to any position of the film length in accordance with the altitude of the aircraft. It is noted that the pilot's vision is limited to the extent that the viewing window 89 is framed by the film housing 90.

FIG. 3 is an electrical circuit diagram for the phototransducer and its associated bridge circuit. As shown, the light source 85 transmits rays in a corresponding manner to the line of sight as indicated by FIG. 2. When the light is directed against the flat surface 93 of the cylinder lens 91, it is focused on the transducer. The cylinder lens has the property of imaging each light point to a line of light or a horizontal light bar 94 independent of the horizontal position of the head as indicated previously. The range of the horizontal head motion is only dependent on the length of the cylinder lens and its focal length. In any case, it is more extended than a conventional spherical lens. By mounting the light transducer in such a manner that the focus light bar 94 falls directly over the resistive strip 100 and the non-restrictive collector 102, the voltage provided by a voltage source 119 connected across the resistive strip is divided according to the position of the light bar. The light bar and non-resistive strip together form a wiper arm for the thus formed variable resistor and is electrically connected to the servo amplifier 106 to form one half of a bridge circuit. The other half of the bridge circuit is formed by a second variable resistor 117, with the voltage source 117 being connected across resistors 100 and 117. The wiper arm of resistor 117 is electrically connected to the servo amplifier 106 and is also mechanically connected to the servomotor 107. Thus, raising or lowering of the position of the light source affects the voltage across the bridge because the light bar changes the wiper position and in an attempt to balance the bridge, the servomotor 107 is activated to raise or lower the entire film housing. Accordingly, the pilot looks through the same portion of film as observed prior to the vertical head movement and before the light source was positioned. It should be noted that the unique feature of this arrangement is that the horizontal head movements do not change the bridge voltage and thus unrestricted side to side head and body movements will not affect the vertical positioning of the film.

It can thus be seen that the present invention provides a needed and useful training device for use in operational aircraft. The visual display device is easily mounted in an aircraft cockpit with the film mounted between the pilot and the window of the plane such the the pilot may actually obtain a view of the ground and other objects exterior to the plane.

We claim:
1. A fog simulator display device for use as a pilot training aid comprising, in combination:
   (a) a film having a light scattering fog simulated coating;
   (b) carriage means for supporting said film and for advancing said film along the longitudinal axis thereof, said carriage means including rollers arranged for forming a film loop such that two layers of said film are positioned in the sight path of a pilot to provide an additive fog density effect;
   (c) a light source arranged for movement with a pilot;
   (d) light sensitive means for providing an electrical signal in response to the position of said light source; and
   (e) means responsive to said electrical signal for vertically positioning said carriage means such that the film is maintained in the original sight path of the pilot in accordance with any vertical movement by the pilot.

2. A fog simulator as defined in claim 1 wherein said fog coated film is provided with a hyperbolic density variation in the vertical direction and is provided with a quadratic density variation along its longitudinal axis.

3. a fog simulator as defined in claim 2 and further including an additional layer of film having a fog density variation along the length thereof, said additional layer of film being supported by said carriage means and arranged for vertical movement therewith, said additional layer being positioned behind said two layers of film and in the sight path of the pilot such that the total density provided by the three layers of film is independent of the longitudinal coordinate of the film.

4. A fog simulator as defined in claim 1 wherein said light sensitive means includes a cylindrical lens and a photopotentiometer, said cylindrical lens being arranged to image the light received from said light source into a light bar on said photopotentiometer which provides an electrical signal corresponding to the position of the light bar.

5. A fog simulator as defined in claim 4 wherein said means for vertically positioning said carriage means includes an electrical bridge circuit wherein said photopotentiometer is provided with a variable resistive portion forming two legs of the bridge, a second variable resistor forming another two legs of the bridge and a battery electrically connected across each of said two legs, a servo amplifier electrically connected to the wiper arm of each of the variable resistors forming the respective legs of the bridge and providing an output signal to a servomotor, said servomotor being mechanically coupled to the wiper arm of said second variable resistor and to a gearing means for vertically positioning said carriage means wherein movement of the light bar on said photopotentiometer provides an electrical signal unbalancing said bridge and said servomotor is driven to balance the bridge and simultaneously driving said gearing means to vertically position said carriage means and the supported fog film.

References Cited
UNITED STATES PATENTS
3,436,840  4/1969  Noxon _____ 35—12

EUGENE R. CAPOZIO, Primary Examiner

P. V. WILLIAMS, Assistant Examiner